United States Patent
Tsumori et al.

(10) Patent No.: US 9,115,311 B2
(45) Date of Patent: Aug. 25, 2015

(54) OXIDE CERAMIC FLUORESCENT MATERIAL HAVING RARE EARTH DIFFUSED THEREIN

(71) Applicant: SHIN-ETSU CHEMICAL CO., LTD., Tokyo (JP)

(72) Inventors: Toshihiro Tsumori, Echizen (JP); Kazuhiro Wataya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 192 days.

(21) Appl. No.: 13/849,236

(22) Filed: Mar. 22, 2013

(65) Prior Publication Data

US 2013/0256600 A1    Oct. 3, 2013

(30) Foreign Application Priority Data

Mar. 27, 2012 (JP) ................. 2012-071174

(51) Int. Cl.
| | |
|---|---|
| *H01L 33/00* | (2010.01) |
| *C09K 11/77* | (2006.01) |
| *C04B 35/115* | (2006.01) |
| *C04B 35/44* | (2006.01) |

(52) U.S. Cl.
CPC ........... *C09K 11/7774* (2013.01); *C04B 35/115* (2013.01); *C04B 35/44* (2013.01); *C04B 2235/3224* (2013.01); *C04B 2235/3225* (2013.01); *C04B 2235/3229* (2013.01); *C04B 2235/75* (2013.01); *C04B 2235/9646* (2013.01); *C04B 2237/60* (2013.01)

(58) Field of Classification Search
USPC .................. 252/301.4 R; 501/152, 153, 126; 428/690
See application file for complete search history.

(56) References Cited

U.S. PATENT DOCUMENTS

| | | | |
|---|---|---|---|
| 7,514,721 B2 | 4/2009 | Krames et al. | |
| 2004/0145308 A1* | 7/2004 | Rossner et al. | ............... 313/512 |
| 2005/0269582 A1 | 12/2005 | Mueller et al. | |
| 2006/0202105 A1* | 9/2006 | Krames et al. | ............. 250/208.1 |
| 2008/0149956 A1 | 6/2008 | Mueller-Mach et al. | |
| 2011/0210658 A1* | 9/2011 | Pan et al. | ....................... 313/112 |
| 2012/0068213 A1 | 3/2012 | Zhang et al. | |

FOREIGN PATENT DOCUMENTS

| | | | |
|---|---|---|---|
| JP | 2866891 B2 | | 3/1999 |
| JP | 2007-150331 | * | 6/2007 |
| WO | 2006/097876 A1 | | 9/2006 |
| WO | 2007/063460 A1 | | 6/2007 |

OTHER PUBLICATIONS

Extended European Search Report dated Jun. 4, 2013, issued in corresponding European Patent Application No. 13160918.2.

* cited by examiner

*Primary Examiner* — Carol M Koslow
(74) *Attorney, Agent, or Firm* — Westerman, Hattori, Daniels & Adrian, LLP

(57) ABSTRACT

An oxide ceramic fluorescent material is provided comprising a polycrystalline ceramic sintered body of $Y_3Al_5O_{12}$, $Lu_3Al_5O_{12}$, $(Y,Lu)_3Al_5O_{12}$, $(Y,Gd)_3Al_5O_{12}$, or $Al_2O_3$ in which a rare earth element selected from Ce, Eu and Tb has been diffused from its surface as fluorescent activator. The concentration of the rare earth element is 1 wt % at a depth of 50-600 μm as measured from the sintered body surface and at least 1 wt % at any position nearer to the sintered body surface.

2 Claims, 3 Drawing Sheets

OXIDE CERAMIC FLUORESCENT MATERIAL HAVING RARE EARTH DIFFUSED THEREIN

CROSS-REFERENCE TO RELATED APPLICATION

This non-provisional application claims priority under 35 U.S.C. §119(a) on Patent Application No. 2012-071174 filed in Japan on Mar. 27, 2012, the entire contents of which are hereby incorporated by reference.

TECHNICAL FIELD

This invention relates to an oxide ceramic fluorescent material for use with a light source in the form of blue LED for wavelength converting a portion of light from the light source for producing light of desired hue suitable for illuminating devices including general illuminating devices, backlight devices and headlamp devices.

BACKGROUND ART

Light-emitting diodes (LEDs) are among the most efficient light sources currently available. Recently, active efforts are made to develop white LEDs by combining blue LED with phosphor or fluorescent material. The mainstream is a pseudo-white LED device which is based on a blue LED combined with a yellow light-emitting phosphor. Examples of the yellow light-emitting phosphor include $Y_3Al_5O_{12}$:Ce, $(Y,Gd)_3(Al,Ga)_5O_{12}$:Ce, $(Y,Gd)_3Al_5O_{12}$:Ce, $Tb_3Al_5O_{12}$:Ce, $CaGa_2S_4$:Eu, $(Sr,Ca,Ba)_2SiO_4$:Eu, and Ca-α-SiAlON:Eu.

The pseudo-white LED illuminating device is generally constructed by dispersing yellow light-emitting phosphor particles in a transparent resin to form a resin-bonded fluorescent material and placing the fluorescent material in front of a blue LED. Pseudo-white light is produced by wavelength converting a portion of light emitted by the blue LED and combing the output with the remaining light.

In this connection, JP-A 2007-150331 discloses a fluorescent material comprising garnet or the like, specifically a light-transmissive, homogeneous fluorescent material capable of fluorescent emission upon excitation by light emitted by a light-emitting component, and a light-emitting device comprising the fluorescent material. This fluorescent material is expected to have higher heat resistance and higher mechanical strength than the prior art resin-bonded fluorescent material comprising a powdered phosphor and a resin in which the phosphor is dispersed, and is also expected to have high durability against the heat that increases as the output of light emitting components increases in the future.

Such sintered fluorescent materials are prepared by formulating a powder raw material having the same composition of constituent elements as the final fluorescent material, shaping, machining, and sintering.

CITATION LIST

Patent Document 1: JP-A 2007-150331 (U.S. Pat. No. 7,514,721, EP 1958269)

SUMMARY OF INVENTION

It is believed preferable from the aspect of light transmittance that the sintered fluorescent material which is a high-density aggregate of crystals serving as fluorescence center has a thickness of the order of 80 microns. However, such thin sintered oxide parts suffer from a low yield of manufacture partly because they are susceptible to breakage during size measurement and finishing after sintering and partly because their emission performance depends on the size. Also, in every application, the type and concentration of activator in the fluorescent raw material prior to sintering must be adjusted in accordance with the characteristics and thickness of fluorescent material required in that application.

An object of the invention is to provide a thin-wall, uniform, rare earth-doped oxide ceramic fluorescent material having the desired characteristics, obtained by diffusing a rare earth element serving as activator into a transparent ceramic sintered body from its surface.

Targeting a uniform, heat resistant fluorescent material excitable with blue light and suitable for the white illumination application, the inventors tried to prepare a sintered fluorescent material having improved heat resistance by using $Y_3Al_5O_{12}$:Ce 2% as fluorescent raw material powder and sintering it at a temperature of 1,800° C. The resulting fluorescent material exhibited yellow fluorescence when irradiated with blue LED light. However, if an attempt was made to reduce the thickness of a sintered body capable of white light emission to a size of 0.1 mm or less, a problem arose that material strength is lost due to the sintered body thickness as well as the volatilization of Ce therefrom.

On the other hand, if fluorescent characteristics were adjusted by forming a sintered body to a substantial thickness and reducing the Ce content, a non-uniform Ce distribution was introduced within the material, resulting in variations of fluorescent characteristics.

Based on the above finding, an attempt was made to form oxide ceramic fluorescent materials having a fluorescent layer on the surface by preparing a variety of transparent oxide ceramic sintered materials, applying a rare earth oxide serving as fluorescent activator onto the surface of oxide ceramic sintered materials by sputtering or the like, and annealing for letting the element diffuse into the material interior. Further studies were made on the ceramic material, activator, and the thickness of activator diffusion layer, completing an oxide ceramic fluorescent material having improved emission characteristics.

The invention provides an oxide ceramic fluorescent material comprising a polycrystalline ceramic sintered body of at least one oxide selected from $Y_3Al_5O_{12}$, $Lu_3Al_5O_{12}$, $(Y,Lu)_3Al_5O_{12}$, $(Y,Gd)_3Al_5O_{12}$, and $Al_2O_3$ in which at least one rare earth element selected from Ce, Eu and Tb has been diffused into its surface. The concentration of the rare earth element is 1% by weight at a depth in the range of 50 μm to 600 μm deep as measured from the sintered body surface and at least 1% by weight at any position nearer to the sintered body surface than that depth. The ceramic sintered body is constructed of polycrystalline grains. Preferably, the rare earth element as fluorescent activator has such a concentration distribution that the concentration decreases from the surface toward the center of the sintered body along grain boundaries.

ADVANTAGEOUS EFFECTS OF INVENTION

The fluorescent material in the form of an oxide ceramic sintered body is heat resistant and suitable in the high-power pseudo-white LED illumination application as compared with the prior art resin-bonded fluorescent materials. A thick-walled transparent ceramic material which is relatively readily available can be used as the matrix or substrate, leading to significant improvements in mechanical strength and manufacture yield. The invention eliminates a need for a number of source materials having varying activator concentrations which are necessary in the prior art for adjusting fluorescent characteristics since they are suitably combined and post-worked to form a fluorescent layer having necessary characteristics.

DESCRIPTION OF PREFERRED EMBODIMENTS

Figure 1:
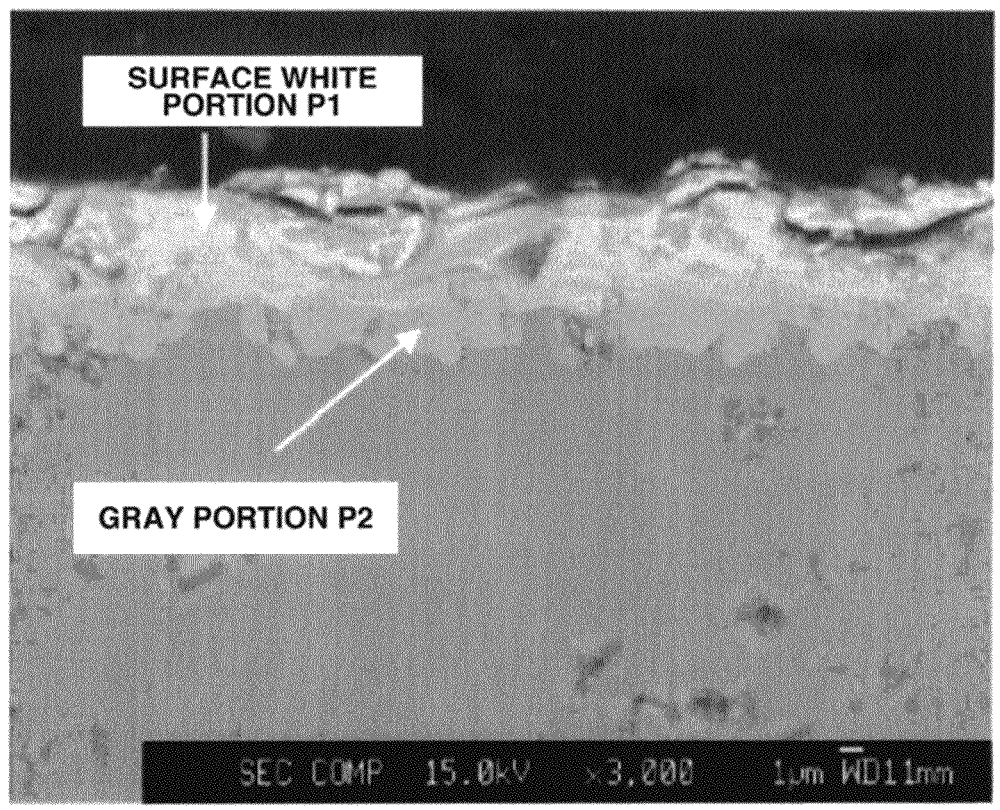
FIG. 1 is a photomicrograph in cross section of the transparent ceramic substrate following the diffusion treatment of activator (ceria) in Example 1.

The light-transmissive oxide ceramic substrate used herein is preferably selected from among $Y_3Al_5O_{12}$, $Lu_3Al_5O_{12}$, $(Y,Lu)_3Al_5O_{12}$, $(Y,Gd)_3Al_5O_{12}$, and $Al_2O_3$, which may be used alone or in admixture. These oxide ceramic sintered bodies are relatively readily available since they are widely used as optical and structural materials besides the fluorescent application contemplated herein. In the prior art method of preparing fluorescent sintered bodies using these materials as the substrate, a fluorescent material is obtained by previously formulating an oxide ceramic powder having a different activator concentration and a different particle size for each desired fluorescent performance, shaping and sintering. An attempt to produce the desired emission characteristics from the sintered fluorescent material prepared by this method fails even if the size and activator concentration slightly deviate from the specified values. It is thus necessary to strictly control the activator concentration and particle size in accordance with the configuration after shaping.

Even when the fluorescent material is prepared by the prior art sintering method, fluorescent characteristics of a sintered body can be adjusted by synthesizing raw materials having different activator concentrations, mixing them, shaping and sintering. Notably, the method has a problem that a number of raw materials are necessary to form a mixture having a certain activator concentration. In an attempt to produce white light using blue LED as the light source, the thickness of a sintered body must be reduced to the order of 0.1 mm before a sintered body having luminescence uniformity and an appropriate transmittance of blue light can be obtained. Such a thin body requires high precision machining after sintering.

To obviate these difficulties of manufacture, it would be desirable if the amount of activator in transparent ceramic can be controlled independent of the substrate type and the machining size. The invention provides a fluorescent material which is superior to the prior art in this respect.

Since the light-transmissive oxide ceramics such as $Y_3Al_5O_{12}$, $Lu_3Al_5O_{12}$, $(Y,Lu)_3Al_5O_{12}$, $(Y,Gd)_3Al_5O_{12}$ and $Al_2O_3$ have a fixed composition, it is relatively easy to prepare sintered bodies of single size therefrom. With respect to the preparation of these ceramic sintered bodies, for example, JP 2866891 describes in detail the preparation of $Y_3Al_5O_{12}$ ceramic material. According to our invention, an activator is introduced into such a light-transmissive oxide ceramic sintered body by coating the surface of an oxide ceramic sintered body with an activator and letting the activator diffuse into the ceramic body. The transparent ceramic body used herein must be constructed of polycrystalline grains. This is because the activator diffuses into the interior along grain boundaries and further into crystal grains. If the ceramic body is monocrystalline, the activator cannot be introduced into the ceramic body in a sufficient amount to exert a wavelength converter function. The desired means of diffusing the activator into the light-transmissive oxide ceramic sintered body is by annealing the ceramic sintered body surface-coated with activator at a high temperature.

The activator used herein is typically an oxide of a rare earth element selected from cerium, europium and terbium.

The activator, when applied to the oxide ceramic sintered body, may be in any form of oxide particle, metal foil, vapor deposited oxide, inorganic salt, organic salt, complex or the like as long as a uniform coating can be formed on the ceramic body as substrate. One preferred coating procedure is by dispersing particles of oxide or the like in a solvent such as water or alcohol, applying the dispersion to the ceramic body, and removing the solvent via volatilization or the like. Alternatively, the activator may be deposited or applied to the ceramic body by sputtering or vacuum evaporation.

The coating weight as the activator is preferably in a range of $3\times10^{-6}$ mol/cm$^2$ to $3\times10^{-5}$ mol/cm$^2$. If the coating weight is less than $3\times10^{-6}$ mol/cm$^2$, the amount of activator available for diffusion is too small to provide the desired performance as the light-emissive ceramic material. If the coating weight exceeds $3\times10^{-5}$ mol/cm$^2$, sintering of the activator alone on the surface or reaction of the activator with the substrate near the surface can occur during high-temperature firing to create a composite which inhibits the activator from diffusing into the substrate, failing to achieve effective activator diffusion.

As the coating weight of the activator is varied in the above range, fluorescent efficiency of the ceramic can be controlled even when irradiated with identical blue LED. For example, assuming that light converting members are produced by uniformly coating light-transmissive YAG with cerium oxide and then annealing, the light converting member resulting from a less coating weight of cerium oxide offers a less proportion of conversion to yellow light upon irradiation with blue LED, and hence light emission having a high color temperature. As the coating weight of cerium oxide is increased, the light emission turns to be of warm color as a whole. According to the invention, the emission color of the wavelength converting member can be changed by varying the coating weight of the activator. This advantageously eliminates a need for precision machining of the wavelength converting member.

The activator coated to the ceramic body may be dried, calcined at or below 800° C., or otherwise treated after coating, depending on the form of activator.

The transparent ceramic body coated with the activator is then heated at a high temperature for letting the activator diffuse into the ceramic body from its surface. Although the firing temperature suitable for activator diffusion varies with the type of both ceramic and activator, the firing temperature is preferably in a range of 1,000 to 1,800° C., more preferably 1,500 to 1,700° C., and even more preferably 1,600 to 1,700° C. A temperature below 1,000° C. may be insufficient to let the activator diffuse into the ceramic body whereas a temperature in excess of 1,800° C. may cause deformation of the ceramic substrate itself. In either case, difficulty may arise in obtaining satisfactory wavelength converting members. The firing atmosphere may be air, reducing or vacuum atmosphere although the choice depends on the type of activator. Firing may be followed by heat treatment at a high temperature again. The firing time is typically 1 to 24 hours, preferably 3 to 15 hours, and more preferably 5 to 12 hours.

Diffusion of the activator into the transparent ceramic body first takes place along grain boundaries in the ceramic body. Thereafter, the activator further diffuses from the grain boundary to the grain interior. Since the activator diffuses along grain boundaries in the ceramic body, the concentration near the grain boundary is higher than at the grain center. Also, the activator around each grain has such a concentration distribution that the concentration may decrease from the grain boundary toward the grain center.

Since the diffusion mode along grain boundaries indicates that diffusion takes place in a narrow zone between crystal grains, the diffusion distance of activator in depth direction is substantially equal among different areas.

The depth of diffusion of the activator is generally in a range of 50 to 600 μm although it depends on the type of ceramic, the size of crystal grains, the type and coating weight of activator, firing temperature, and firing time. According to the invention, the concentration of the activator (i.e., specific rare earth element) is 1% by weight at a depth in the range of 50 μm to 600 μm deep, preferably 200 μm to 500 μm deep as measured from the sintered body surface, and the activator concentration is at least 1% by weight at any position nearer to the sintered body surface than that depth. It is understood that the activator concentration is less than 1% by weight at any position remote from the sintered body surface with respect to that depth. If the position where the activator concentration is equal to 1% by weight is shallower than 50 μm from the surface, that is, if the thickness of the diffusion layer is less than 50 μm, the fluorescent characteristics become poor due to shortage of fluorescent component. If the position where the activator concentration is equal to 1% by weight is deeper than 600 μm from the surface, that is, if the thickness of the diffusion layer exceeds 600 μm, the proportion of blue light transmitted by the fluorescent material relative to fluorescence is reduced because of the increased thickness, failing to produce white light.

In a preferred embodiment, the activator has such a concentration distribution in thickness direction of the sintered body that the concentration gradually decreases from the surface to the depth of the sintered body.

The light-transmissive oxide ceramic body (or polycrystalline ceramic sintered body) preferably has a thickness of 0.1 to 3 mm, more preferably 0.5 to 2 mm.

The transparent ceramic body having the activator diffused therein may be ground on the activator-coated surface for the purpose of removing the undiffused activator, or roughened by sand blasting or the like for the purpose of increasing asperities for improving light diffusion or transmittance.

The wavelength converting member thus manufactured has high transparency and fluorescent efficiency.

The ceramic body as annealed has a flat and smooth surface. On cross-sectional observation by BEI, a region where the activator diffused along the grain boundary in the matrix was confirmed across a limited narrow range from the surface. The thickness of this activator diffusion region and the activator diffusion state were uniform at every area on the ceramic substrate surface.

As demonstrated in Examples, the fluorescent material produces white light upon excitation from blue LED. As used herein, the term "white light" refers to light of a hue having a x value of 0.28 to 0.4 and a y value of 0.3 to 0.45 in the chromaticity coordinate system. The fluorescent material of transmission type using excitation light of wavelength 450 nm according to the invention can produce light of any hue in the above range by changing the activator diffusion depth. The relationship of diffusion depth to hue is approximate to Table 2 below although some variations occur with such factors as impurity in and surface roughness of the ceramic body. For this reason, the diffusion depth is selected in a range of 50 μm to 600 μm.

EXAMPLE

Examples of the invention are given below by way of illustration and not by way of limitation.

Example 1

A light-transmissive YAG ceramic substrate of 1 mm thick having a purity of 99.99% and a linear transmittance of 75% at wavelength 450 nm was coated with cerium oxide particles having an average particle size of 200 nm. The coated substrate was calcined at 600° C. and fired in a mixed gas atmosphere of 98% Ar and 2% hydrogen at 1,650° C. for 5 hours. The ceria-coated surface of the ceramic substrate as fired was polished by a polishing tool, completing a wavelength converting member.

A cross section of the wavelength converting member was observed under SEM, finding that cerium had diffused into the ceramic substrate along grain boundaries. The diffusion depth was about 100 μm from the surface.

When irradiated with light of wavelength 450 nm, the wavelength converting member emitted light having a peak at wavelength ~552 nm in addition to the transmitted light. The light from the oxide ceramic surface was white light.

FIG. 1 illustrates a cross section of the light-transmissive YAG ceramic substrate following the diffusion treatment of activator (ceria) as observed under SEM (BEI×2000). Table 1 shows semi-quantitative determination values of surface white portion P1 and gray portion P2 in FIG. 1 and the YAG ceramic (sintered body).

TABLE 1

| | Semi-quantitative determination values (wt %) | | | | |
|---|---|---|---|---|---|
| | Y | Al | Ce | O | Total |
| P1 | 14.3 | 14.8 | 52.0 | 27.1 | 108.2 |
| P2 | 45.8 | 18.6 | 9.0 | 31.1 | 104.5 |
| Sintered YAG | 39.5 | 25.2 | — | 31.1 | 95.8 |

It is noted that unlike quantitative analysis, semi-quantitative analysis involves quantitative correction from spectral data. Specifically, the semi-quantitative determination value is obtained by identifying an element by qualitative analysis software, determining a peak background intensity from the qualitative spectrum based on the identified element, computing a ratio of the intensity to the characteristic X-ray intensity of pure element, and making corrections therefrom.

Figure 2:
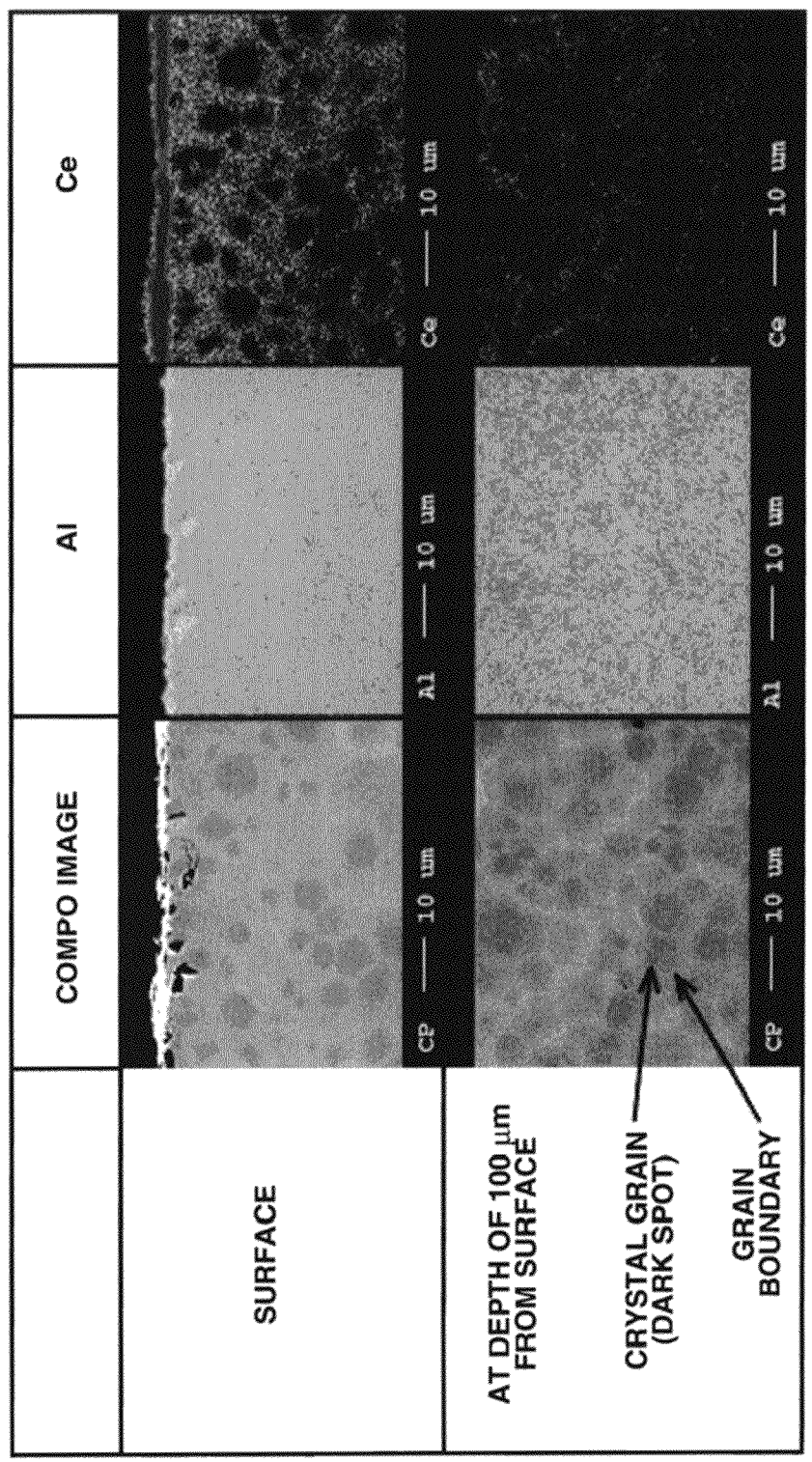
FIG. 2 illustrates the distribution of elements near the surface following the diffusion treatment.

FIG. 2 illustrates the distribution of elements near the surface following the diffusion treatment.

Example 2

Using a magnetron sputtering system, cerium oxide particles were coated on the surface of a light-transmissive YAG ceramic substrate of 1 mm thick having a purity of 99.99% and a linear transmittance of 75% at wavelength 450 nm. The ceria-coated YAG ceramic substrate was fired in a mixed gas atmosphere of 98% Ar and 2% hydrogen at 1,650° C. for 5 hours. The ceria-coated surface of the ceramic substrate as fired was polished by a polishing tool, completing a wavelength converting member.

Figure 3:
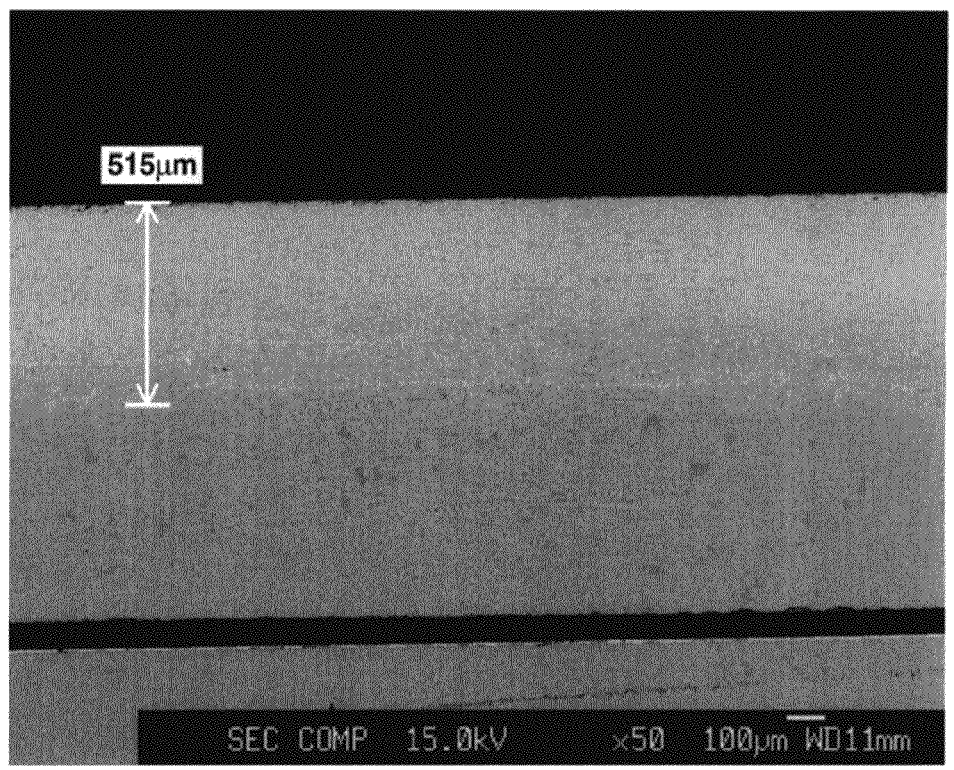
FIG. 3 is a secondary electron image (magnification ×50) of the cross section near the surface in Example 2.

A cross section of the wavelength converting member was observed by EPMA. FIG. 3 is a secondary electron image (magnification ×50) of the cross section near the surface. As seen from FIG. 3, cerium had diffused into the ceramic substrate along grain boundaries, with a diffusion depth of 515

μm. When irradiated with light of wavelength 450 nm, the wavelength converting member emitted light having a peak at wavelength ~552 nm in addition to the transmitted light. The light from the oxide ceramic surface was white light.

Comparative Example 1

Using a magnetron sputtering system, cerium oxide particles were coated on the surface of a light-transmissive YAG ceramic substrate of 1 mm thick having a purity of 99.99% and a linear transmittance of 75% at wavelength 450 nm. The ceria-coated YAG ceramic substrate was fired in a mixed gas atmosphere of 98% Ar and 2% hydrogen at 1,700° C. for 1 hour. The ceria-coated surface of the ceramic substrate as fired was polished by a polishing tool, completing a (wavelength converting) member.

A cross section of the member was observed, finding that cerium had diffused into the ceramic substrate along grain boundaries, with a diffusion depth of about 20 μm. When the member or ceramic substrate was irradiated with light of wavelength 450 nm, blue light was perceived on the transmitting side of the ceramic substrate.

Comparative Example 2

Using a magnetron sputtering system, cerium oxide particles were coated on the surface of a light-transmissive YAG ceramic substrate of 1 mm thick having a purity of 99.99% and a linear transmittance of 75% at wavelength 450 nm. The ceria-coated YAG ceramic substrate was fired in a mixed gas atmosphere of 98% Ar and 2% hydrogen at 1,650° C. for 12 hours. The ceria-coated surface of the ceramic substrate as fired was polished by a polishing tool, completing a wavelength converting member.

A cross section of the wavelength converting member was observed, finding that cerium had diffused into the ceramic substrate along grain boundaries, with a diffusion depth of about 900 μm. When the member or ceramic substrate was irradiated with light of wavelength 450 nm, yellow fluorescent emission was perceived on the back side of the ceramic substrate.

Table 2 tabulates the diffusion depth and x and y coordinates in chromaticity coordinate system of Examples 1 and 2 and Comparative Examples 1 and 2.

TABLE 2

| Diffusion depth (thickness of 1-10% activator) | x coordinate | y coordinate | |
|---|---|---|---|
| 20 μm | 0.21 | 0.18 | Comparative Example 1 |
| 50 μm | 0.28 | 0.30 | |
| 100 μm | 0.30 | 0.31 | Example 1 |
| 200 μm | 0.31 | 0.32 | |
| 515 μm | 0.36 | 0.41 | Example 2 |
| 600 μm | 0.40 | 0.45 | |
| 900 μm | 0.41 | 0.51 | Comparative Example 2 |

Japanese Patent Application No. 2012-071174 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An oxide ceramic fluorescent material comprising a transparent polycrystalline ceramic sintered body of at least one oxide selected from the group consisting of $Y_3Al_5O_{12}$, $Lu_3Al_5O_{12}$, $(Y,Lu)_3Al_5O_{12}$, $(Y,Gd)_3Al_5O_{12}$, and $Al_2O_3$ in which at least one rare earth element as a fluorescent activator selected from the group consisting of Ce, Eu and Tb has been diffused into the polycrystalline ceramic sintered body, wherein the concentration of the rare earth element is 1% by weight at a depth in the range of 50 μm to 600 μm deep as measured from the sintered body surface and at least 1% by weight at any position nearer to the sintered body surface than said depth.

2. The oxide ceramic fluorescent material of claim 1 wherein the ceramic sintered body is constructed of polycrystalline grains, and the rare earth element as fluorescent activator has such a concentration distribution that the concentration decreases from the surface toward the center of the sintered body along grain boundaries.

* * * * *